US012073977B2

(12) United States Patent
Chiba et al.

(10) Patent No.: US 12,073,977 B2
(45) Date of Patent: Aug. 27, 2024

(54) METHOD FOR MANUFACTURING REACTOR, AND REACTOR

(71) Applicant: Komatsu Ltd., Tokyo (JP)

(72) Inventors: Makoto Chiba, Tokyo (JP); Shoji Aoki, Tokyo (JP); Hiromasa Kaibe, Tokyo (JP)

(73) Assignee: Komatsu Ltd., Tokyo (JP)

( * ) Notice: Subject to any disclaimer, the term of this patent is extended or adjusted under 35 U.S.C. 154(b) by 622 days.

(21) Appl. No.: 17/041,230

(22) PCT Filed: Nov. 21, 2018

(86) PCT No.: PCT/JP2018/042975

§ 371 (c)(1),
(2) Date: Sep. 24, 2020

(87) PCT Pub. No.: WO2019/187326

PCT Pub. Date: Oct. 3, 2019

(65) Prior Publication Data

US 2021/0366646 A1 Nov. 25, 2021

(30) Foreign Application Priority Data

Mar. 29, 2018 (JP) ................................ 2018-065178

(51) Int. Cl.
*H01F 27/25* (2006.01)
*H01F 27/255* (2006.01)
(Continued)

(52) U.S. Cl.
CPC ......... *H01F 27/255* (2013.01); *H01F 41/066* (2016.01)

(58) Field of Classification Search
CPC ............................ H01F 27/255; H01F 41/066
See application file for complete search history.

(56) References Cited

U.S. PATENT DOCUMENTS

2012/0206232 A1* 8/2012 Yamamoto ................ H01F 3/14 336/210
2014/0112044 A1* 4/2014 Kawaguchi ........... H01F 27/022 29/606

(Continued)

FOREIGN PATENT DOCUMENTS

CN 201616330 10/2010
CN 103597560 2/2014

(Continued)

*Primary Examiner* — Malcolm Barnes
(74) *Attorney, Agent, or Firm* — Fish & Richardson P.C.

(57) ABSTRACT

A method for manufacturing a reactor includes: assembling a core-coil assembly including a reactor core that includes an inner-side core part extending in a first direction and an outer-side core part extending in a second direction and being linked to the inner-side core part, and a coil disposed around the inner-side core part with a gap therebetween and wound in a tubular shape extending in the first direction, external dimensions of the coil corresponding to external dimensions of the outer-side core part in a third direction; installing the core-coil assembly in a mold in an orientation in which the third direction extends upward and downward so that a lowermost part of the coil in the third direction and a lowermost part of the outer-side core part coincide; and filling at least the gap with an insulation material by injection molding.

7 Claims, 10 Drawing Sheets

(51) Int. Cl.

| | |
|---|---|
| ***H01F 41/06*** | (2016.01) |
| ***H01F 41/066*** | (2016.01) |

(56) References Cited

U.S. PATENT DOCUMENTS

| | | | | |
|---|---|---|---|---|
| 2017/0352478 | A1 | 12/2017 | Hirabayashi et al. | |
| 2018/0040407 | A1* | 2/2018 | Yamamoto | H01F 3/14 |
| 2020/0013542 | A1* | 1/2020 | Nanbara | H01F 27/325 |
| 2020/0075230 | A1* | 3/2020 | Inaba | H01F 27/022 |
| 2020/0143974 | A1 | 5/2020 | Inaba et al. | |

FOREIGN PATENT DOCUMENTS

| | | | | |
|---|---|---|---|---|
| CN | 107210118 | | | 9/2017 |
| JP | 2010045112 | A | * | 2/2010 |
| JP | 2012-238659 | | | 12/2012 |
| JP | 2012238659 | A | * | 12/2012 |
| JP | 2013-038244 | | | 2/2013 |
| JP | A-2015-204353 | | | 11/2015 |
| JP | 2016-131200 | | | 7/2016 |
| JP | 2018-133461 | | | 8/2018 |
| JP | 2010-045112 | | | 2/2020 |

* cited by examiner

METHOD FOR MANUFACTURING REACTOR, AND REACTOR

CROSS-REFERENCE TO RELATED APPLICATIONS

This application is a National Stage application under 35 U.S.C. § 371 of International Application No. PCT/JP2018/042975, filed on Nov. 21, 2018, which claims priority to Japanese Patent Application No. 2018-065178, filed on Mar. 29, 2018. The contents of the prior applications are incorporated herein in their entirety.

TECHNICAL FIELD

The present invention relates to a method for manufacturing a reactor and a reactor.

BACKGROUND ART

Patent Document 1 describes a reactor mounted on a vehicle such as a hybrid vehicle or an electric vehicle. A reactor includes a core including a pressure powder molding formed by press-molding raw material powder containing soft magnetic powder, a resin mold covering the outer surface of the core, and a coil wound around the core from above the resin mold.

CITATION LIST

Patent Document

Patent Document 1
Japanese Patent No. 2016-131200

SUMMARY OF INVENTION

Technical Problem

The reactor described in Patent Document 1 is designed for mass production because the reactor core is used in a vehicle such as a hybrid vehicle or an electric vehicle. When the reactor is mass-produced in this way, it is desirable to reduce a cycle time of a manufacturing line.

For this reason, in the method for manufacturing the reactor described in Patent Document 1, a resin cover for the core and a resin cover for the coil are preformed and stocked. Patent Document 1 discloses that the coil is assembled after the core resin cover is put on the core, and then the coil resin cover is attached.

However, since it is necessary to stock a plurality of resin cover types and it is necessary to prepare a plurality of metal mold types for forming the plurality of resin cover types when mass production is not performed, the cost ratio of the metal mold may increase and the productivity may decrease.

An object of the present invention is to provide a method for manufacturing a reactor, and a reactor which can restrain a decrease in productivity.

Solution to Problem

A method for manufacturing a reactor according to an aspect of the present invention, including: an assembly manufacturing step including a reactor core having a plurality of inner-side core parts extending in a first direction and two outer-side core parts extending in a second direction intersecting with the first direction and connecting adjacent inner-side core parts in the second direction, a coil that can be arranged around the inner-side core part while spaced apart therefrom and that is wound in a tubular shape extending in the first direction, and a coil wound in a tubular shape so that it can be arranged around the inner-side core part while spaced apart therefrom and extend in the first direction, and manufacturing a core-coil assembly in which an external dimension of the coil in a third direction intersecting with the first direction and the second direction is a dimension corresponding to the external dimension of the outer-side core part in the third direction; an installation step of installing the core-coil assembly in a mold in an orientation in which the third direction extends upward and downward so that a position of a lowermost part of the coil and a position of a lowermost part of the outer-side core part in the third direction coincide with each other; and an injection molding step of injecting insulating material in at least the gap by injection molding.

Advantageous Effects of Invention

According to the reactor core of the above aspect, the reactor core can restrain a decrease in productivity.

DESCRIPTION OF EMBODIMENTS

Hereinafter, embodiments of the present invention will be described in detail with reference to FIGS. 1 to 11.

Step-Up Circuit

Figure 1:
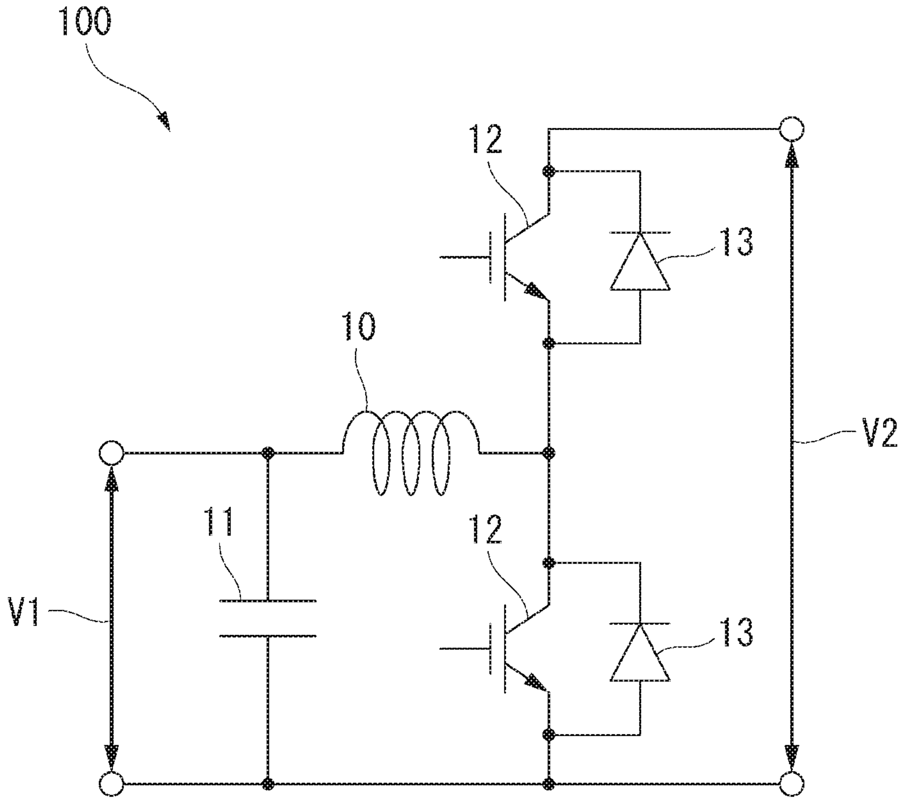
FIG. 1 is a circuit diagram of a step-up circuit according to one embodiment of the present invention.

As shown in FIG. 1, a reactor 10 according to the present embodiment constitutes a part of a step-up circuit 100. The step-up circuit 100 is a chopper type step-up circuit, and includes the reactor 10, a capacitor 11, and a power semiconductor 12 such as an IGBT. The step-up circuit 100 according to the present embodiment is built in an inverter that drives an electric motor mounted on a hybrid hydraulic excavator or the like, and steps up a terminal voltage V1 of a capacitor or the like to a voltage V2 required by the inverter. In FIG. 1, reference sign "13" denotes a free-wheeling diode.

Reactor

Figure 2:
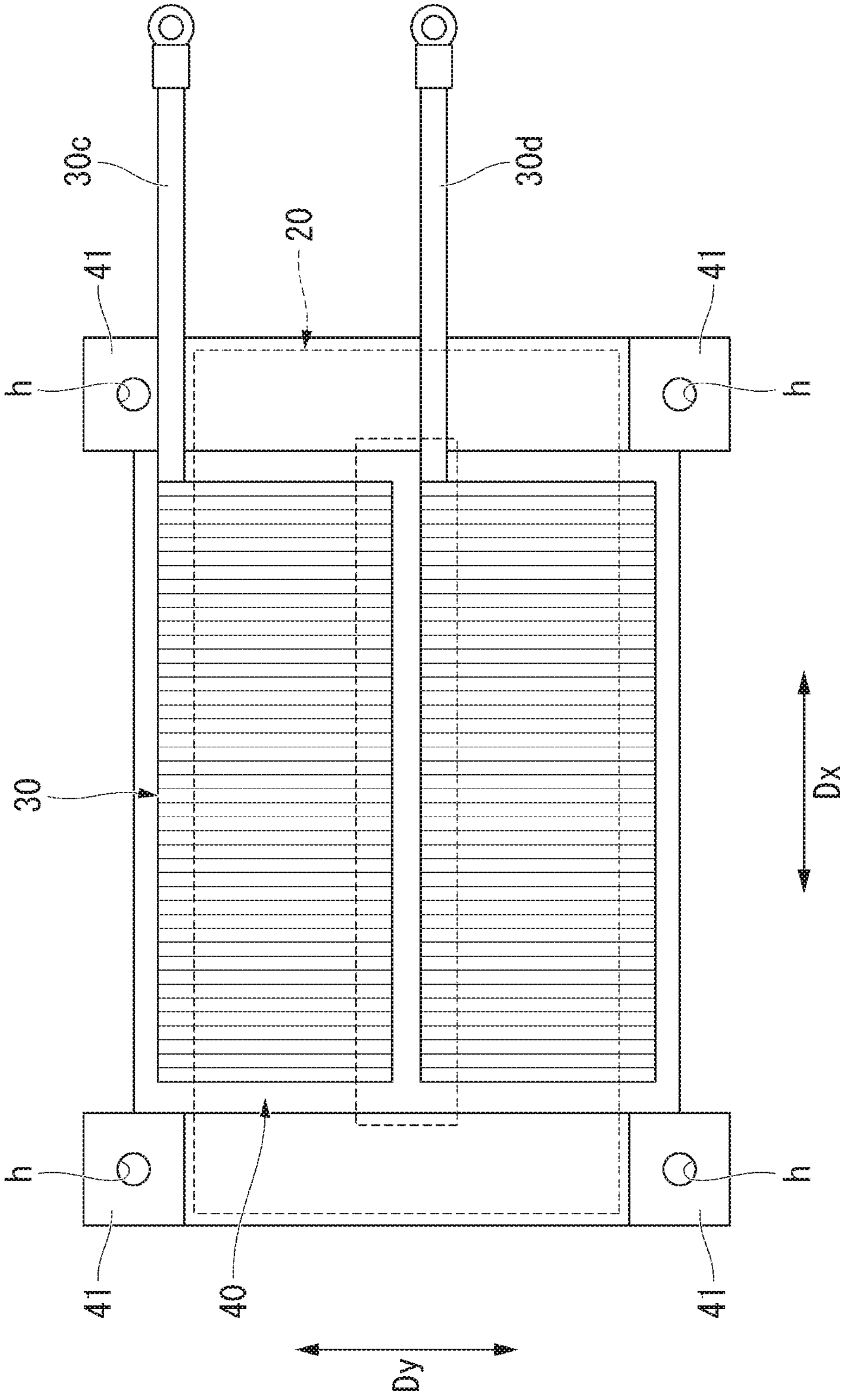
FIG. 2 is a plan view of a reactor according to one embodiment of the present invention.

As shown in FIG. 2, the reactor 10 includes a reactor core 20, a coil 30, and an insulating member 40. Since the reactor 10 according to the present embodiment is a reactor used in a hybrid hydraulic excavator or the like, a large current flows through the reactor 10 as compared with a reactor used in a vehicle such as an automobile. Therefore, the reactor 10 according to the present embodiment is larger than the reactor used in a vehicle such as an automobile. In the following description, the first direction is defined as "Dx" and the second direction intersecting with the first direction is defined as "Dy". A third direction intersecting with the first direction Dx and the second direction Dy is defined as "Dz".

Reactor Core

Figure 3:
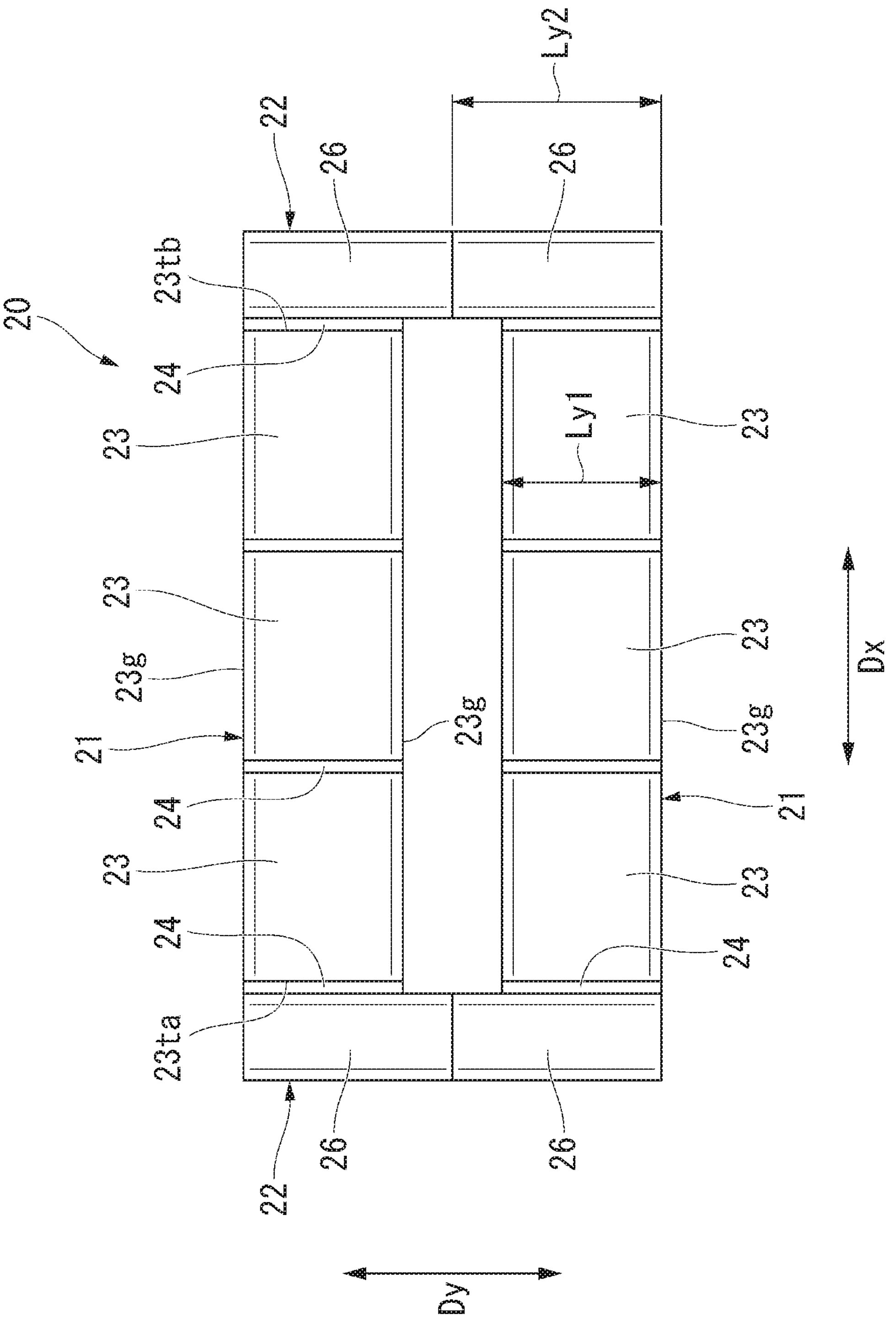
FIG. 3 is a plan view of a reactor core according to one embodiment of the present invention.
Figure 4:
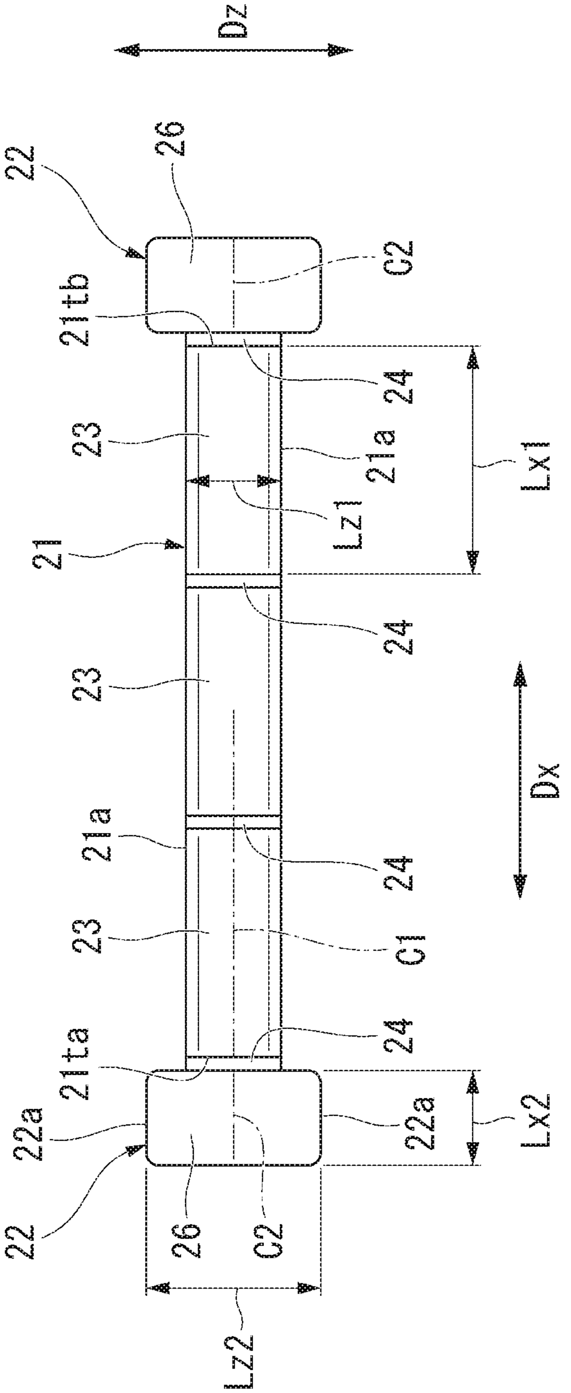
FIG. 4 is a side view of the reactor core mentioned above seen from a second direction.

As shown in FIGS. 3 and 4, the reactor core 20 includes two inner-side core parts 21 and two outer-side core parts 22. In the reactor core 20, the two inner-side core parts 21 and the two outer-side core parts 22 have a rectangular ring shape in a plan view.

The two inner-side core parts 21 extend in the first direction Dx. The inner-side core part 21 includes a first end surface 21*ta* and a second end surface 21*tb* on both sides in the first direction Dx. The two inner-side core parts 21 are arranged at interval in the second direction Dy intersecting with the first direction Dx.

The inner-side core part 21 has a plurality of first magnetic cores 23 and a plurality of gap members 24. Each of the inner-side core parts 21 as shown in FIG. 3 has three first magnetic cores 23 and four gap members 24.

The first magnetic core 23 is a cuboid. Specifically, the first magnetic core 23 is formed in a shape of a cuboid in which each of four corner parts 23*g* extending in the first direction Dx is formed into a curved surface shape that is outwardly convex similar to chamfering. The thickness dimension Lz1 of the first magnetic core 23 illustrated in the present embodiment in the third direction is less thick than the dimension in the first direction and the dimension in the second direction. In the first magnetic cores 23 arranged in line in the first direction Dx, the four outer surfaces around the axis extending in the first direction are arranged to be flush with each other. The first magnetic core 23 according to the present embodiment is formed by press-molding raw material powder containing soft magnetic powder such as iron.

Each of the gap members 24 is arranged between the first magnetic cores 23 adjacent to each other in the first direction Dx. The gap member 24 is a spacer that forms a predetermined gap between the first magnetic cores 23 adjacent to each other in the first direction Dx. The gap member 24 is made of, for example, a non-magnetic material such as ceramics, aluminum oxide (alumina), synthetic resin, or the like, which has excellent insulating properties and heat resistance. The gap member 24 is formed in a flat plate shape, and has an outer shape that is slightly smaller than or equal to the cross-sectional shape of the first magnetic core 23 perpendicular to the first direction Dx.

The gap members 24 illustrated in the present embodiment are arranged between the inner-side core part 21 and the outer-side core part 22 respectively. The gap member 24 is fixed by bonding or the like respectively to the first magnetic core 23 and a second magnetic core 26 to be described later. The total gap length of the reactor core 20 formed by the plurality of gap members 24 can be calculated according to conditions such as the saturation current value of the reactor core 20 and the maximum value of the current flowing through the coil 30. When the total gap length is constant, the thickness per gap member 24 is small as the number of the gap members 24 installed increases.

Two outer-side core parts 22 extend in the second direction Dy and are arranged at intervals in the first direction Dx. The outer-side core part 22 is arranged above the first end surfaces 21*ta* adjacent to each other in the second direction Dy, and is arranged above the second end surfaces 21*tb* adjacent to each other in the second direction Dy. The outer-side core part 22 has a second magnetic core 26. The outer-side core part 22 shown in FIG. 3 has two second magnetic cores 26 for each outer-side core part 22.

The second magnetic core 26 has a shape of a cuboid. Two second magnetic cores 26 are arranged in line in the second direction Dy. The second magnetic core 26 in the present embodiment has a shape (substantially the same shape) corresponding to the first magnetic core 23. The second magnetic cores 26 adjacent to each other in the second direction Dy are fixed to each other by adhesion or the like. Nothing corresponding to the above-described gap member 24 is arranged between the second magnetic cores 26 adjacent to each other in the second direction Dy.

The second magnetic core 26 according to the present embodiment differs from the first magnetic core 23 only in the direction in which it is arranged, and the external dimension of the second magnetic core 26 corresponds to that of the first magnetic core 23. In other words, the second magnetic core 26 has substantially the same shape as the shape of the first magnetic core 23. The dimension Ly2 in the second direction of the second magnetic core 26 illustrated in the present embodiment (see FIG. 3) is thicker than the dimension Lx2 in the first direction Dx (see FIG. 4) and the thickness dimension Lz2 in the third direction Dz (see FIG. 4). The thickness dimension Lx2 of the second magnetic core 26 in the first direction Dx is substantially the same as the thickness dimension Lz1 (see FIG. 4) of the first magnetic core 23 in the third direction Dz. That is, the thickness dimension Lz2 of the second magnetic core 26 in the third direction Dz is thicker than the thickness dimension Lz1 of the first magnetic core 23.

As shown in FIG. 4, the center position C1 of the inner-side core part 21 in the third direction Dz and the center position C2 of the outer-side core part 22 in the third direction Dz coincide with each other. As described above, since the thickness dimension Lz2 is greater than the thickness dimension Lz1, the outer surface 21*a* of the inner-side core part 21 in the third direction Dz is arranged inside the outer surface 22*a* of the outer-side core part 22 in the third direction Dz (in other words, it is arranged on the side close to the center position C1).

In addition to the first magnetic core 23, the second magnetic core 26 in the present embodiment is formed by press-molding raw material powder containing soft magnetic powder such as iron. The second magnetic cores 26 in the present embodiment are respectively formed by using the same mold member as the mold member forming the first magnetic core 23 or another mold member having the same shape as a shape of the mold member forming the first magnetic core 23. In the present embodiment, the number (three) of the first magnetic cores 23 arranged in line in the first direction Dx is greater than the number (two) of the second magnetic cores 26 arranged in line in the second direction Dy.

Coil

Figure 5:
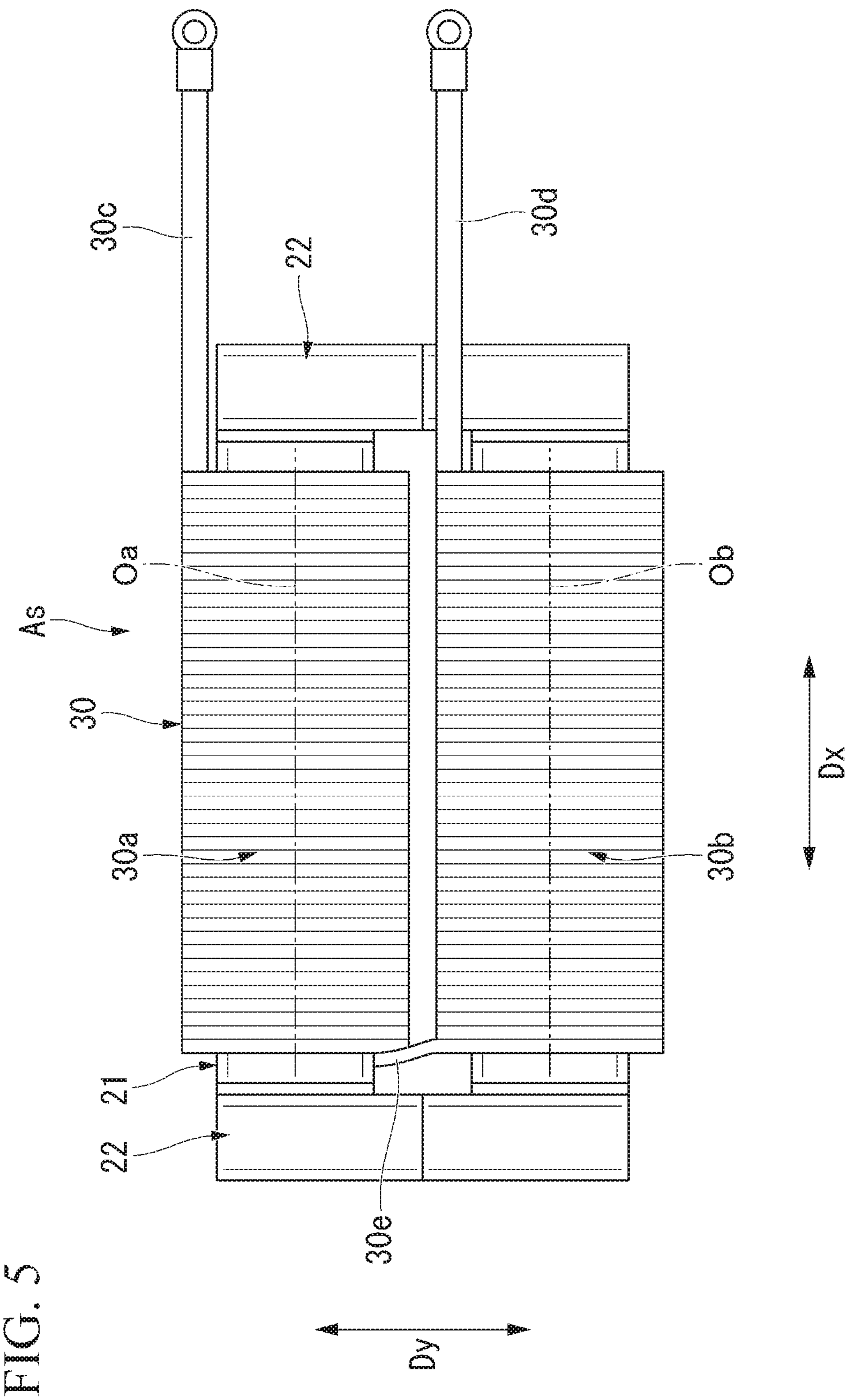
FIG. 5 is a plan view of a coil attached to the reactor mentioned above.
Figure 6:
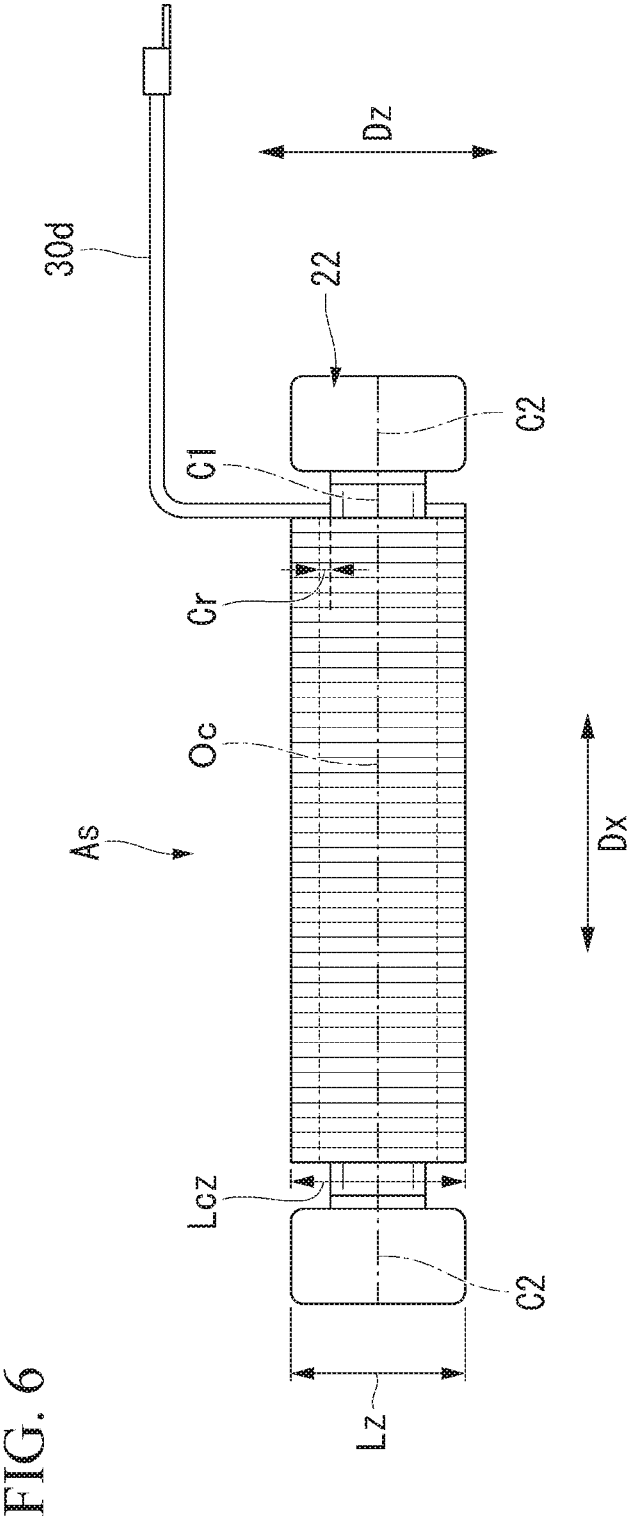
FIG. 6 is a side view of a coil attached to the reactor mentioned above seen from a second direction.
Figure 7:
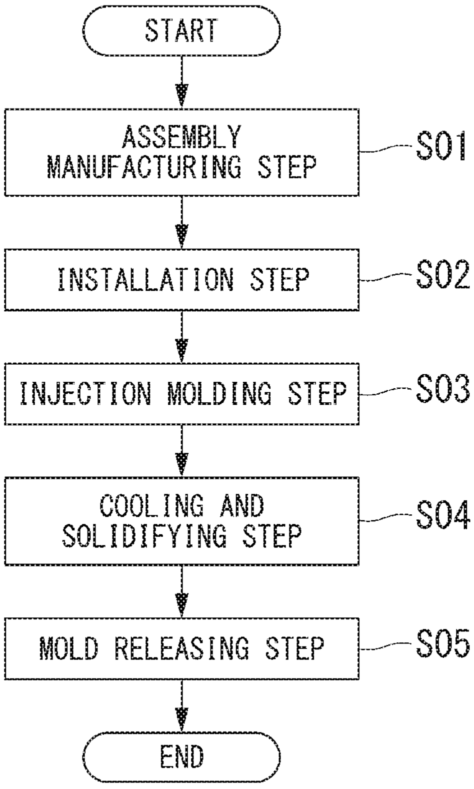
FIG. 7 is a flow chart of a method for manufacturing reactor core and a method for manufacturing reactor according to one embodiment of the present invention.

As shown in FIGS. 5 and 6, the coil 30 is formed by making a wire rod such as a copper wire into a solenoid shape wind. The coil 30 includes two tubular parts 30*a* and 30*b* formed side by side in parallel. The tubular parts 30*a* and 30*b* are electrically connected in series and are respectively attached on the two inner-side core parts 21 arranged in parallel. The axes Oa and Ob of the tubular parts 30*a* and 30*b* extend in the first direction Dx. The leader lines 30*c* and 30*d* of the coil 30 are both arranged on one side in the first direction Dx. The wire rod 30*e* extending between the tubular parts 30*a* and 30*b* is arranged on the opposite side of the leader lines 30*c* and 30*d* in the first direction Dx. These two tubular parts 30*a* and 30*b* are wound around the inner-side core part 21 by inserting the inner-side core part 21, respectively. The wire rods that form the two tubular parts 30*a* and 30*b* are wound such that the directions of the lines of magnetic force inside the reactor core 20 formed in a ring shape when the coil 30 is energized are in the same direction.

As shown in FIG. 6, the external dimension Lcz of the coil 30 in the third direction Dz is set to a dimension corresponding to the external dimension Lz of the outer-side core part 22 in the third direction Dz (in other words, substantially the same dimension). When the coil 30 is placed on a plane so that the third direction Dz coincides with the vertical direction, the center Oc of the coil 30 in the third direction Dz, the center position C1 of the inner-side core part 21 in the third direction Dz, and the center position C2 of the outer-side core part 22 in the third direction Dz are arranged substantially on the same plane. Gaps Cr are respectively formed between the tubular part 30*a* and the inner-side core part 21 arranged inside the tubular part 30*a*, and between the tubular part 30*b* and the inner-side core part 21 arranged inside the tubular part 30*b* around the entire circumference of the inner-side core part 21.

Insulating Member

The insulating member 40 shown in FIG. 2 electrically insulates between the reactor core 20 and the coil 30. As the insulating member 40, a synthetic resin having excellent insulation performance and a heat-resisting property can be used. The thickness and quality of material of the insulating member 40 may be selected according to the required insulation performance and a heat-resisting property. The insulating member 40 according to the present embodiment is formed so as to cover the entire reactor core 20.

Method for Manufacturing Reactor

Next, a method for manufacturing the reactor core will be described with reference to FIGS. 7 to 11.

First, a core-coil assembly As including the reactor core 20 and the coil 30 (see FIG. 5 and FIG. 6) is manufactured (step S01; assembly manufacturing step). Specifically, raw material powder containing the same soft magnetic powder is press-molded using the same mold member or a plurality of mold members having the same shape (none of which are shown), and a plurality of first magnetic cores 23 and a plurality of second magnetic cores 26 are formed.

All the dust cores molded by the above-mentioned mold members have substantially the same shape (corresponding external dimensions). Therefore, the dust core immediately after being molded by the mold member may not be distinguish between the first magnetic core 23 and the second magnetic core 26 as core components. In the present embodiment, the dust core immediately after being molded by the mold member is managed and stored without distinction between the first magnetic core 23 and the second magnetic core 26. Even if the same mold member or the mold member having the same shape is used, a slight difference in shape may occur between the first magnetic core 23 and the second magnetic core 26. The above-mentioned "substantially the same shape" and "corresponding external dimensions" mean that even if such a slight difference in shape occurs, they are regarded as the same shape.

Next, the two inner-side core parts 21 are assembled by using the dust cores molded by the above-mentioned mold members as the first magnetic cores 23. At this time, the gap member 24 is put between the first magnetic cores 23 and fixed by adhesion or the like. Similarly, the outer-side core parts 22 are assembled using the dust cores molded by the above-mentioned mold members as the second magnetic cores 26. At this time, the gap member 24 is not put between the end surfaces 26*t* of the two second magnetic cores 26 that are arranged to face each other in the second direction Dy, and these two end surfaces 26*t* are directly fixed by adhesion or the like.

Figure 8:
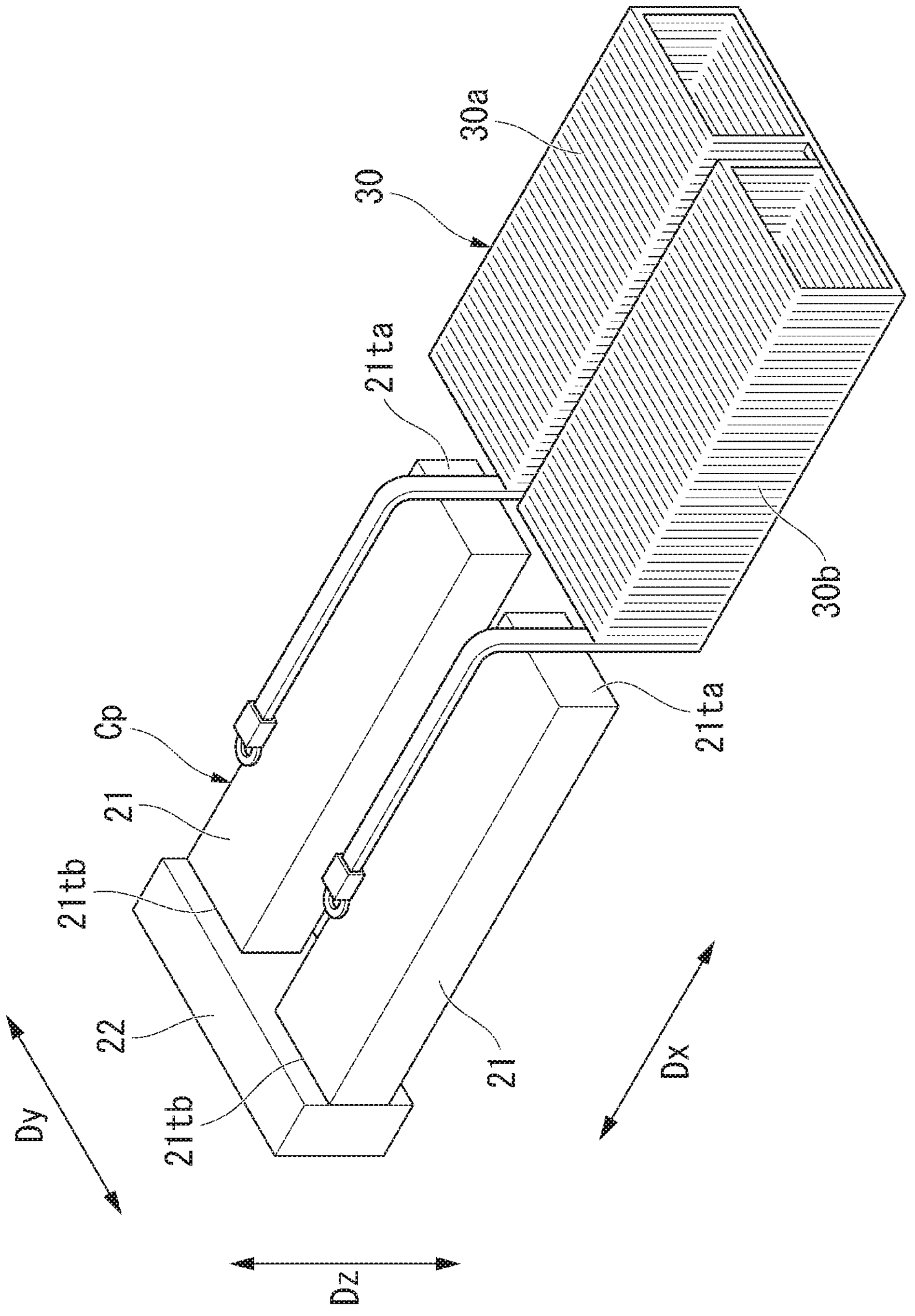
FIG. 8 is a perspective view showing a state immediately before inserting the inner-side core part into the coil.
Figure 9:
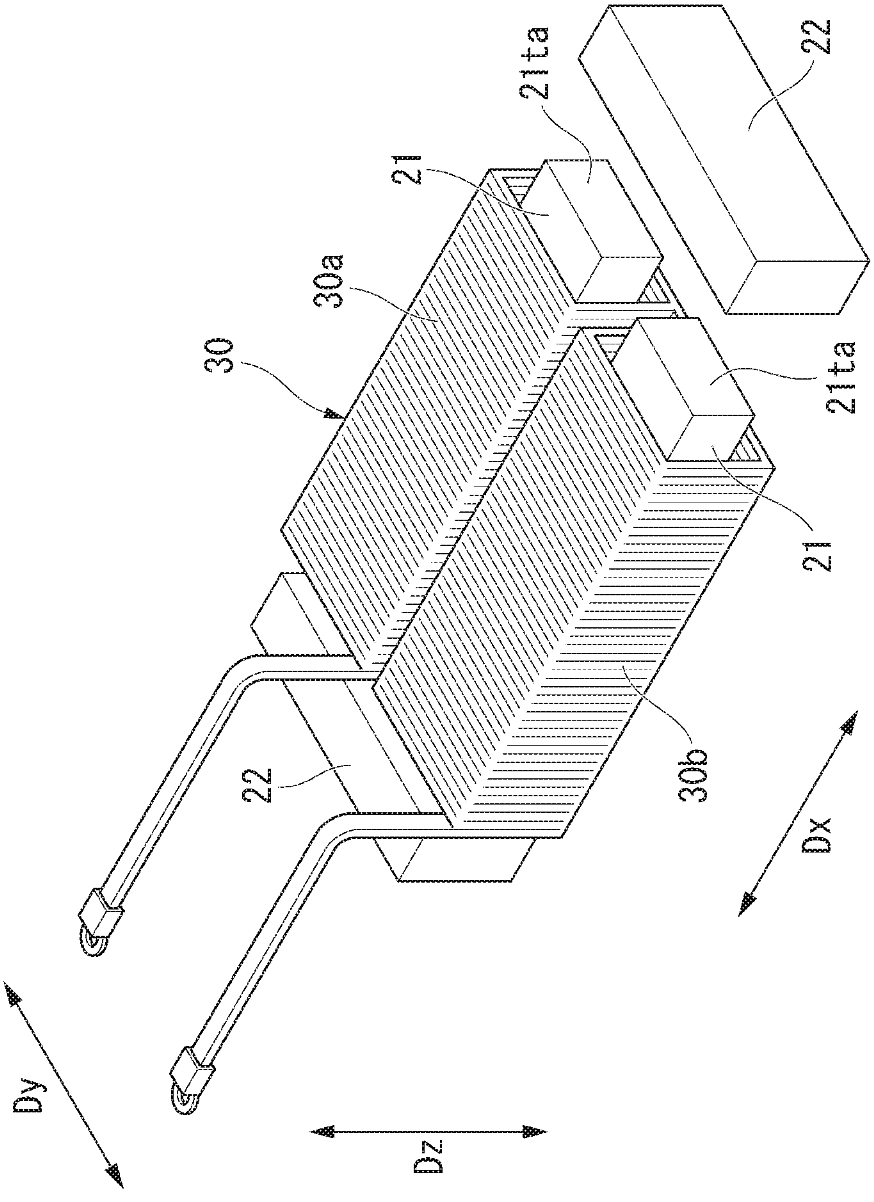
FIG. 9 is a perspective view showing a state immediately before fixing an outer-side core part to a second end part of the inner-side core part mentioned above.

Next, the reactor core 20 is assembled by using the two inner-side core parts 21 and the two outer-side core parts 22. The coil 30 is attached during the assembly of the reactor core 20. As shown in FIGS. 8 and 9, in the present embodiment, a core component Cp having U-shape is formed by fixing the second end surfaces 21*tb* of the two inner-side core parts 21 to one outer-side core part 22 by adhesion or the like. As shown in FIG. 9, the inner-side core parts 21 of the core component Cp formed in U-shape are inserted into the two tubular parts 30*a* and 30*b* of the coil 30, respectively. Thereafter, the other outer-side core part 22 is fixed to the first end surfaces 21*ta* on the open side of the two inner-side core parts 21 by adhesion or the like.

By fixing the inner-side core part 21 and the outer-side core part 22, the reactor core 20 is formed in a ring shape, and the core-coil assembly As with the coil 30 attached to the inner-side core part 21 is completed. The procedure for attaching the coil 30 described in the present embodiment is an example, and is not limited to the above-mentioned procedure.

Figure 10:
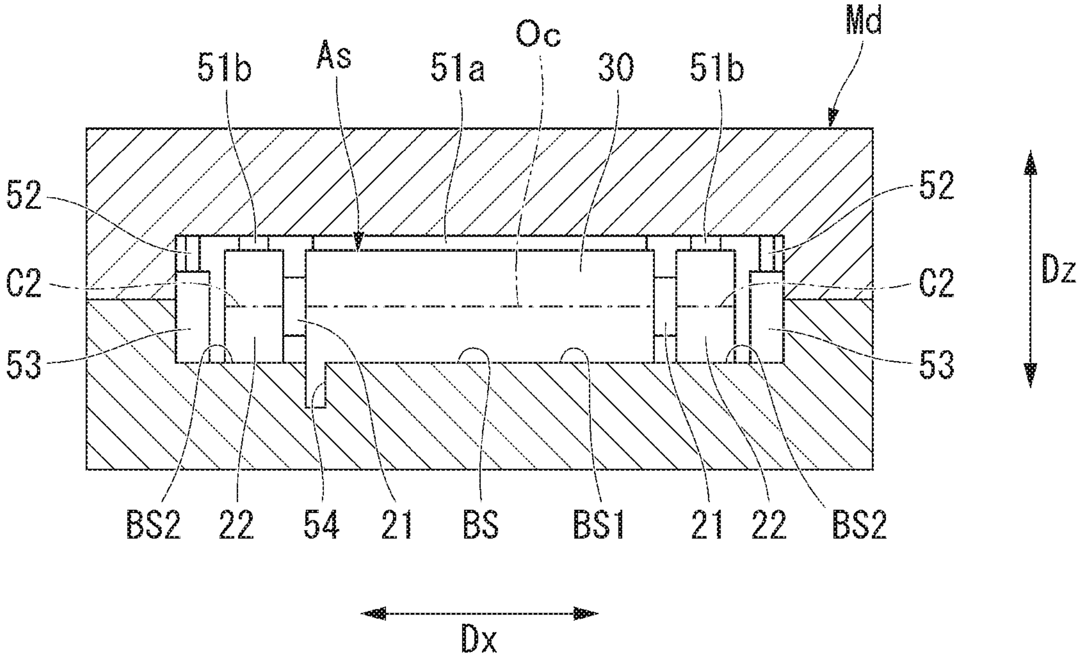
FIG. 10 is a sectional view showing a state where a coil and a reactor placed on a metal mold.
Figure 11:
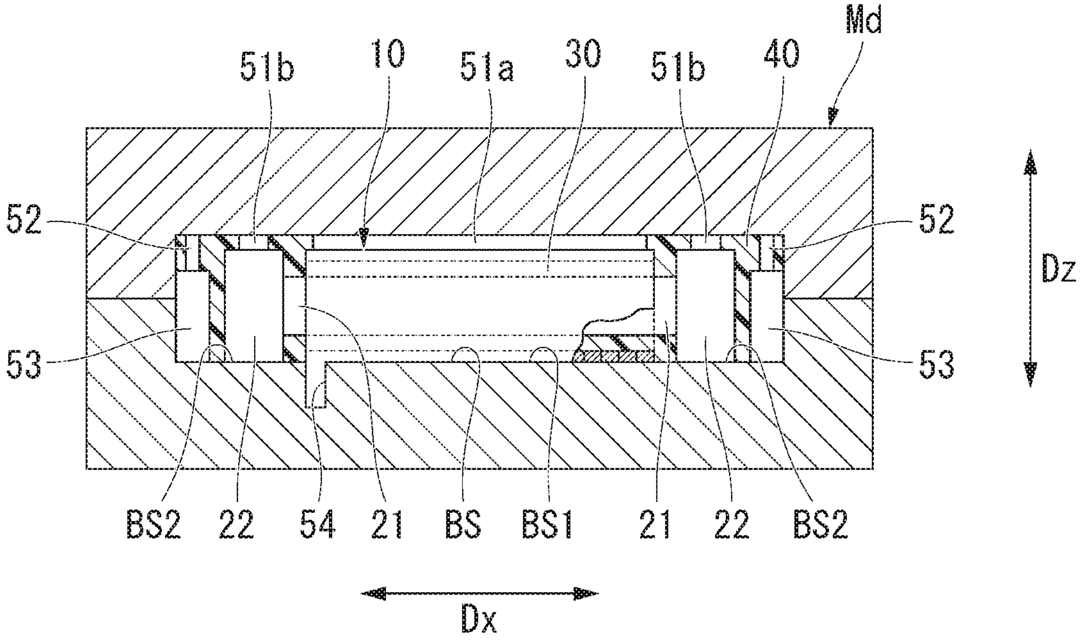
FIG. 11 is a sectional view showing a state where an insulating member filled in a metal mold by injection molding.

Next, as shown in FIGS. 10 and 11, the core-coil assembly As is installed in an injection molding metal mold Md so that the third direction Dz extends upward and downward (step S02; installation step).

The metal mold Md includes a first support surface BS1 that supports the coil 30 from below, and a second support surface BS2 that supports the outer-side core part 22 of the reactor core 20 from below. The first supporting surface BS1 and the second support surface BS2 form a plane where the positions in the third direction Dz are substantially the same. The bottom surface BS of the metal mold Md in the present embodiment is a substantially continuous horizontal surface including the first supporting surface BS1 and the second support surface BS2.

By installing the coil 30 on the first support surface BS1 and installing the outer-side core part 22 of the reactor core 20 on the second support surface BS2, the position of the lowermost part of coil 30 and the position of the lowermost part of outer-side core part 22 coincide with each other. Therefore, the center Oc of the coil 30 and the center position C2 of the outer-side core part 22 are arranged substantially on the same plane. In the present embodiment, since the center position C2 of the outer-side core part 22 and the center position C1 of the inner-side core part 21 are arranged on substantially the same plane, the gap Cr between the tubular part 30*a* and the inner-side core part 21 (see FIG. 6) is formed symmetrically in the third direction based on the center position.

Next, the metal mold Md is closed, as shown in FIG. 11, the material of the insulating member 40 that has been heated and melted in the metal mold Md is injected, and at least the gap Cr between the reactor core 20 and the coil 30 is filled with the material of the insulating member 40 (step S03: injection molding step). The insulating member 40 according to the present embodiment is formed so as to cover the gap Cr between the reactor core 20 and the coil 30, and the entire outer surface of the reactor core 20 arranged around the coil 30. As shown in FIG. 2, the insulating member 40 according to the present embodiment includes mounting hole forming parts 41 at the four corners seen from the third direction Dz. These mounting hole forming parts 41 include mounting holes h for fixing the reactor 10 to a case of an inverter and the like or installing a heat sink.

In FIGS. 10 and 11, reference sign "51*a*" indicates a pressing member that presses the coil 30 to prevent the coil 30 from moving in the metal mold Md. Reference sign "51*b*" indicates each pressing member that presses the reactor core 20 to prevent the reactor core 20 from moving in the metal mold Md. Reference sign "52" indicates a collar for forming the mounting hole h. Reference sign "53" is a collar presser foot. Reference sign "54" indicates a groove for letting out the leader lines 30*c* and 30*d* of the coil 30. The pressing members 51*a* and 51*b*, the collar 52, and the collar presser foot 53 are not limited to the above-mentioned shapes and arrangements. The pressing members 51*a* and 51*b*, the collar 52, and the collar presser foot 53 may be determined according to various conditions such as the specifications of the reactor 10 and the shape of the metal mold Md.

Next, the insulating member 40 is cooled and solidified (step S04; cooling and solidifying step), the metal mold Md is opened, and the reactor 10 is taken out (step S05; mold releasing step).

Action and Effect

As described above, in the assembly manufacturing step (step S01) according to the present embodiment, the core-coil assembly As in which the external dimension Lcz of the coil 30 in the third direction Dz corresponds to the external dimension Lz of the outer-side core part 22 in the third direction Dz is manufactured. In the installation step (step S02), the core-coil assembly As is installed in the metal mold in an orientation in which the third direction Dz extends upward and downward so that the position of the lowermost part of coil 30 and the position of the lowermost part of outer-side core part 22 in the third direction Dz coincide with each other. In the injection molding step (step S03), at least the gap Cr is filled with the insulating member 40 by injection molding. Therefore, simply by installing the core-coil assembly As in the metal mold Md, the position of the coil 30 is determined with respect to the reactor core 20, and the gap Cr can be appropriately formed between the inner-side core part 21 and the coil 30. Since the gap Cr is appropriately formed, the gap Cr can be filled with the insulating member 40 by injection molding in this manner. Therefore, it is not necessary to prepare a plurality of metal mold types for molding the insulating member 40 in advance, or to stock the molded insulating member 40, and the decrease in productivity can be restrained even if mass production is not performed.

Further, in the present embodiment, in the assembly manufacturing step (step S01), the inner-side core part 21 is arranged so that the center position C1 of the inner-side core part 21 in the third direction Dz is arranged at a position corresponding to the center position C2 of the outer-side core part 22 in the third direction Dz. Therefore, when the core-coil assembly As is installed in the metal mold Md, the center position C1 of the inner-side core part 21 in the third direction Dz and the position of the center Oc of the coil 30 can coincide with each other. Since the center position C1 and the position of the center Oc coincide with each other in this way, the gap Cr between the tubular part 30*a* and the inner-side core part 21 can be formed symmetrically in the third direction Dz based on the center position C1 of the inner-side core part 21. Therefore, in the injection molding step (step S03), it is possible to fill the gap Cr with the insulating member 40 in a stable manner.

In the reactor 10 according to the present embodiment, the external dimension Lcz of the coil 30 in the third direction Dz is a dimension corresponding to the external dimension Lz2 of the outer-side core part 22 in the third direction Dz. Therefore, when the reactor 10 is manufactured, simply by installing the reactor core 20 and the coil 30 in a plane in an orientation in which the third direction Dz extends upward and downward, the position of the coil 30 is determined with respect to the reactor core 20.

In this posture, the outer-side core part 22 projects vertically above the inner-side core part 21. Therefore, when the cross-sectional areas of the magnetic paths of the inner-side core part 21 and the outer-side core part 22 are made equal, the dimension of the outer-side core part 22 in the first direction Dx can be reduced. Accordingly, the dimension of the reactor 10 in the first direction Dx can be reduced.

In the reactor 10 of the present embodiment, the center position C1 of the inner-side core part 21 in the third direction Dz is arranged at a position corresponding to the center position C2 of the outer-side core part 22 in the third direction Dz. In this way, since the center position C1 and the center position C2 in the third direction Dz coincide with each other, the gap Cr can be formed symmetrically based on the center position C1 of the inner-side core part 21. Therefore, even in the case where the gap Cr is filled with the insulating member 40 by injection molding, the insulation performance of the insulating member 40 can be exhibited in a stable manner.

Other Embodiments

The embodiments of the present invention have been described above, but the present invention is not limited thereto, and can be appropriately modified without departing from the technical idea of the invention.

In the embodiment, the example in which the present invention is applied to the step-up circuit 100 of the hybrid hydraulic excavator has been described, but it may be applied to another step-up circuit.

Although the reactor core 20 of the embodiment has the two inner-side core parts 21, it may have three or more inner-side core parts 21.

In the embodiment, in the second direction Dy, the outer surface of the two inner-side core parts 21 that are arranged in parallel and the end surfaces 26*t* of the outer-side core parts 22 are arranged flush with each other. However, the outer surface of the inner-side core portion 21 and the end surface 26*t* in the second direction Dy may not be arranged flush with each other.

As the reactor core 20 according to the embodiment, the reactor core 20 assembled using the dust core having substantially the same shape has been described. However, the reactor core 20 is not limited to the reactor core assembled using a dust core and the reactor core assembled using magnetic cores having substantially the same shape. For example, the reactor core may be configured by combining an I-shaped core and a U-shaped core.

The curved surface formed on the second magnetic core 26 according to the embodiment, which is convex outward such as the chamfer may be provided as necessary and may be omitted.

INDUSTRIAL APPLICABILITY

According to the reactor core mentioned above, the reactor core can restrain a decrease in productivity.

The invention claimed is:

1. A method for manufacturing a reactor, the method comprising:

manufacturing a core-coil assembly that includes:

a reactor core including (i) a plurality of inner-side core parts extending in a first direction and (ii) two outer-side core parts extending in a second direction intersecting the first direction, the two outer-side core parts connecting adjacent inner-side core parts among the plurality of inner-side parts in the second direction, and a coil including a plurality of tubular parts that are arranged around an entire circumference outside the plurality of inner-side core parts with a gap defined around the entire circumference between an outside of the plurality of inner-side core parts and an inside of the plurality of tubular parts, each of the plurality of tubular parts being wound in a tubular shape extending in the first direction, wherein an external dimension of the plurality of tubular parts in a third direction intersecting the first direction and the second direction corresponds to an external dimension of the two outer-side core parts in the third direction;

installing the core-coil assembly in a mold in an orientation in which the third direction extends upward and downward such that a position of a lowermost part of the plurality of tubular parts corresponds to a position of a lowermost part of the two outer-side core parts in the third direction; and injecting an insulating member in the gap by injection molding.

2. The method for manufacturing the reactor according to claim 1, wherein the core-coil assembly is manufactured such that a center position of the plurality of inner-side core parts in the third direction corresponds to a center position of the two outer-side core parts in the third direction.

3. The method for manufacturing the reactor according to claim 1, wherein the core-coil assembly is installed on a plane surface in the mold.

4. The method for manufacturing the reactor according to claim 1, wherein the plurality of tubular parts comprise:

a first tubular part that is arranged around a first inner-side core part among the plurality of the inner-side core parts and spaced apart from the first inner-side core part by the first gap defined between an outside of the first inner-side core part and an inside of the first tubular part; and a second tubular part that is arranged around a second inner-side core part among the plurality of the inner-side core parts spaced apart from the second inner-side core part by a second gap defined between an outside of the second inner-side core part and an inside of the second tubular part, and wherein injecting the insulation member comprises injecting an insulation material to the first gap and the second gap.

5. A reactor comprising:

a reactor core including (i) a plurality of inner-side core parts extending in a first direction and (ii) two outer-side core parts extending in a second direction intersecting the first direction, the two outer-side core parts connecting adjacent inner-side core parts among the plurality of inner-side core parts in the second direction;

a coil including a plurality of tubular parts that are arranged around an entire circumference outside the plurality of inner-side core parts with a gap defined around the entire circumference between an outside of the plurality of inner-side core parts and an inside of the plurality of tubular parts, each of the plurality of tubular parts being wound in a tubular shape extending in the first direction;

an insulating member injected in the gap by injection molding, wherein an external dimension of the plurality of tubular parts in a third direction intersecting the first direction and the second direction corresponds to an external dimension of the two outer-side core parts in the third direction.

6. The reactor core according to claim 5, wherein a center position of the plurality of inner-side core parts in the third direction corresponds to a center position of the two outer-side core parts in the third direction.

7. The reactor according to claim 5, wherein the plurality of tubular parts comprise:

a first tubular part that is arranged around a first inner-side core part among the plurality of the inner-side core parts and spaced apart from the first inner-side core part by a first gap defined between an outside of the first inner-side core part and an inside of the first tubular part; and a second tubular part that is arranged around a second inner-side core part among the plurality of the inner-side core parts and spaced apart from the second inner-side core part by a second gap defined between an outside of the second inner-side core part and an inside of the second tubular part, and wherein the insulation member comprises an insulation material injected to the first gap and the second gap.

* * * * *